United States Patent
Tsai et al.

(10) Patent No.: US 12,077,419 B2
(45) Date of Patent: Sep. 3, 2024

(54) METHOD AND SYSTEM FOR CONTROLLING A HANDLING MACHINE AND NON-VOLATILE COMPUTER READABLE RECORDING MEDIUM

(71) Applicant: Industrial Technology Research Institute, Hsinchu (TW)

(72) Inventors: Tsung-Ting Tsai, New Taipei (TW); Carlos Andres Betancourt Baca, New Taipei (TW); Yen-Chung Chang, Hsinchu County (TW); Ching-Yi Liu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 929 days.

(21) Appl. No.: 17/126,030

(22) Filed: Dec. 18, 2020

(65) Prior Publication Data
US 2022/0194762 A1    Jun. 23, 2022

(51) Int. Cl.
*B66F 9/06* (2006.01)
*B66F 9/075* (2006.01)
*G05B 13/02* (2006.01)
*G05D 1/00* (2024.01)
(Continued)

(52) U.S. Cl.
CPC ............ *B66F 9/063* (2013.01); *B66F 9/0755* (2013.01); *G05B 13/0265* (2013.01); *G05D 1/0253* (2013.01); *G06V 10/44* (2022.01); *G06V 20/56* (2022.01)

(58) Field of Classification Search
CPC .... B66F 9/063; B66F 9/0755; G05B 13/0265; G05D 1/0253; G05D 1/0246; G06V 10/44; G06V 20/56; G06V 10/752
See application file for complete search history.

(56) References Cited

U.S. PATENT DOCUMENTS

| | | | |
|---|---|---|---|
| 5,938,710 A | 8/1999 | Lanza et al. | |
| 10,922,541 B2 * | 2/2021 | Shiraishi | G06V 40/10 |
| 11,886,953 B2 * | 1/2024 | Chakravarty | G06Q 10/0833 |

(Continued)

FOREIGN PATENT DOCUMENTS

| | | |
|---|---|---|
| CN | 102530776 | 8/2016 |
| CN | 106044645 | 10/2016 |

(Continued)

OTHER PUBLICATIONS

Office Action of Taiwan Counterpart Application, issued on Jan. 3, 2022, pp. 1-13.

(Continued)

*Primary Examiner* — Michael Collins
(74) *Attorney, Agent, or Firm* — JCIPRNET (57) ABSTRACT

A method and a system for controlling a handling machine, and a non-volatile computer readable recording medium are provided. The method includes: analyzing image data to obtain contour data corresponding to a target in the image data; analyzing the contour data to obtain feature data, where the feature data reflects the position of the target in the physical space; and generating control data based on the feature data, where the control data is adapted to control the handling machine to transport the target in response to the position of the target in the physical space.

19 Claims, 7 Drawing Sheets

(51) Int. Cl.
*G06V 10/44* (2022.01)
*G06V 20/56* (2022.01)

(56) References Cited

U.S. PATENT DOCUMENTS

| | | | | |
|---|---|---|---|---|
| 2014/0193034 A1* | 7/2014 | Oami | ............... | G06V 40/10 |
| | | | | 382/103 |
| 2015/0146916 A1* | 5/2015 | Lee | ............... | B66C 13/46 |
| | | | | 382/103 |
| 2020/0242345 A1* | 7/2020 | Huang | ............... | G06V 10/44 |
| 2021/0056497 A1* | 2/2021 | Engedal | ............... | G06V 20/52 |
| 2024/0019870 A1* | 1/2024 | Zhu | ............... | G05D 1/0214 |

FOREIGN PATENT DOCUMENTS

| | | |
|---|---|---|
| CN | 107507167 | 12/2017 |
| CN | 107218927 | 8/2019 |
| CN | 110852279 | 2/2020 |
| CN | 110950277 | 4/2020 |
| DE | 102010048662 | 4/2012 |
| TW | 201304919 | 2/2013 |
| TW | M545777 | 7/2017 |
| TW | I626704 | 6/2018 |
| TW | I637455 | 10/2018 |
| TW | M589626 | 1/2020 |

OTHER PUBLICATIONS

Benjamin Molter et al., "Real-time Pallet Localization with 3D Camera Technology for Forklifts in Logistic Environments", 2018 IEEE International Conference on Service Operations and Logistics, and Informatics (SOLI), Jul. 31-Aug. 2, 2018, pp. 1-6.

Sungmin Byun et al., "Real-Time Positioning and Orienting of Pallets Based on Monocular Vision", 2008 20th IEEE International Conference on Tools with Artificial Intelligence, Nov. 3-5, 2008, pp. 505-508.

He Zhendong et al., "Feature-to-Feature based Laser Scan Matching for Pallet Recognition", 2010 IEEE International Conference on Measuring Technology and Mechatronics Automation, Mar. 13-14, 2010, pp. 260-263.

Tianjian Li et al., "Cargo pallets real-time 3D positioning method based on computer vision", The Journal of Engineering, Dec. 2019, pp. 8551-8555.

Gang Chen et al., "Pallet recognition and localization method for vision guided forklift", 2012 8th IEEE International Conference on Wireless Communications, Networking and Mobile Computing, Sep. 21-23, 2012, pp. 1-4.

Guang-Zhao Cui et al., "A robust autonomous mobile forklift pallet recognition", CAR'10: Proceedings of the 2nd international Asia conference on Informatics in control, automation and robotics, Mar. 2010, pp. 286-290.

* cited by examiner

METHOD AND SYSTEM FOR CONTROLLING A HANDLING MACHINE AND NON-VOLATILE COMPUTER READABLE RECORDING MEDIUM

BACKGROUND

Technical Field

The disclosure relates to a technology for controlling a handling machine, particularly to a method and a system for controlling a handling machine and a non-volatile computer readable recording medium.

Description of Related Art

As the transaction pattern changes and the demand for automated logistics management such as smart warehouse gradually increases, ever more logistics companies hope to adopt automated handling devices to handle, load, and unload their cargoes automatically. However, the existing image recognition technology cannot be directly applied to logistics management systems. The reason is that the cargo to be transported and/or the pallets carrying the cargo are often arranged irregularly in the physical space. Therefore, even if the transport device identifies the cargo, it still fails to control and insert the arms or clamps accurately into the grooves of the pallet under the cargo at a specific angle to transport the pallet along with the cargo above it. In addition, the cargo packages to be transported and/or the appearance of the pallets carrying the cargo may have defects or damages, thereby increasing the difficulty for image recognition.

SUMMARY

The present disclosure provides a method and a system for controlling a handling machine, and a non-volatile computer readable recording medium, capable of improving the efficiency of the handling machine in performing cargo transportation automatically.

The embodiment of the present disclosure provides a method for controlling a handling machine. The method includes: analyzing image data to obtain contour data corresponding to a carrier in the image data; analyzing the contour data to obtain feature data of the carrier, where the feature data reflects a position of the carrier in the physical space; and generating control data based on the feature data, where the control data is adapted to control the handling machine to transport the carrier in response to the position of the carrier in the physical space.

The embodiment of the present disclosure further provides a system for controlling a handling machine. The system includes a handling machine and a control host. The control host is coupled to the handling machine. The control host is adapted to analyse image data to obtain contour data corresponding to a carrier in the image data. The control host is further adapted to analyse the contour data to obtain feature data of the carrier, where the feature data reflects a position of the carrier in the physical space. The control host is further adapted to generate control data based on the feature data. Based on the control data, the handling machine is adapted to transport the carrier in response to the position of the carrier in the physical space.

The embodiment of the present disclosure further provides a non-volatile computer readable recording medium adapted to store a program code, and the program code is executed by a processor to: analyse image data to obtain contour data corresponding to a carrier in the image data; analyse the contour data to obtain feature data of the carrier, where the feature data reflects a position of the carrier in the physical space; and generate control data based on the feature data, where the control data is adapted to control the handling machine to transport the carrier in response to the position of the carrier in the physical space.

Based on the above, after analyzing the image data to obtain the contour data corresponding to the carrier in the image data, the contour data is further analysed to obtain the carrier's feature data, which reflects the position of the carrier in the physical space. Then, the control data is generated based on the feature data. Particularly, the control data is adapted to control the handling machine to transport the carrier in response to the position of the carrier in the physical space. The efficiency of the handling machine in performing cargo transportation automatically is thereby improved effectively.

DESCRIPTION OF THE EMBODIMENTS

Figure 1:
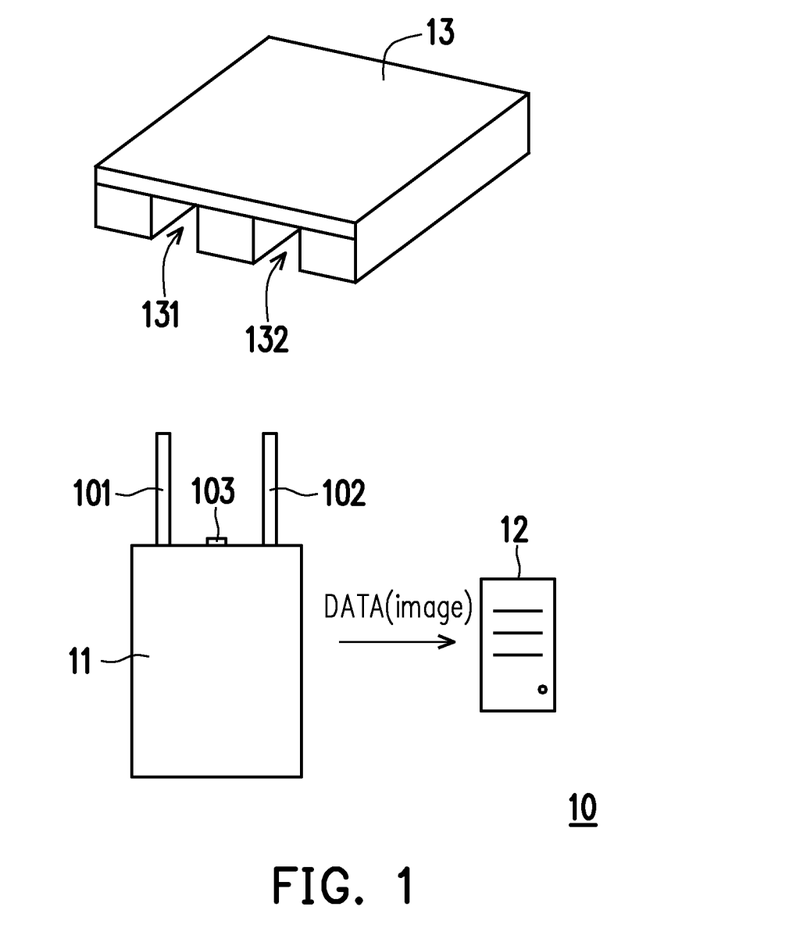
FIG. 1 is a schematic diagram of a system for controlling a handling machine according to an embodiment of the present disclosure.

FIG. 1 is a schematic diagram of a system for controlling a handling machine according to an embodiment of the present disclosure. In FIG. 1, a system (also referred to as a handling machine control system) 10 includes a handling machine 11, a control host 12, and a carrier 13. The numbers of the handling machine 11, the control host 12, and the carrier 13 may be one or more, to which the present disclosure does not put a limit.

The handling machine 11 is adapted to transport the carrier 13. For example, the handling machine 11 may have a moving and/or rotating mechanism to perform actions such as going forward, backward, and/or turning on the ground. In addition, the handling machine 11 may have extension arms 101 and 102. For example, the handling machine 11 controls the extension arms 101 and 102 to move vertically or horizontally, such that the handling machine 11 uses the extension arms 101 and 102 to transport the carrier 13. In an embodiment, the handling machine 11 may be a stacker, a pallet truck, a tray truck, a forklift, a fork truck, or the like. In one embodiment, the extension arms 101 and 102 may also be used as mechanical parts such as fixtures, trays, or robotic arms that can be adapted to transport the carrier 13, whereas the carrier 13 may be a pallet, a tray, a platform, or other flat or three-dimensional structure for carrying objects. The control host 12 may be a desktop computer, a notebook computer, a tablet computer, an industrial computer, a server, or other types of computer devices with functions of data transmission and processing. The handling machine 11 may communicate with the control host 12.

In FIG. 1 and the following embodiments, the carrier 13 is a pallet just as an example. The cargo may be placed on the carrier 13. And there are be grooves 131 and 132 below the carrier 13. The groove 131 can be regarded as an insertion opening for the extension arm 101, and the groove 132 can be regarded as an insertion opening for the extension arm 102. The handling machine 11 inserts the extension arms 101 and 102 respectively into the grooves 131 and 132. After the extension arms 101 and 102 are respectively inserted into the grooves 131 and 132, the handling machine 11 controls the extension arms 101 and 102 to lift the carrier 13. Note that in other embodiments that are not elaborated here, the carrier 13 may also include other types of carriers, as long as it may be carried by the handling machine 11. In addition, the appearance of the handling machine 11 in FIG. 1 is only drawn for schematic purposes. Its actual appearance may change based on the actual type of the handling machine 11.

It should be noted that in the embodiment of FIG. 1, the extension arms 101 and 102 of the handling machine 11 are not aligned with the grooves 131 and 132 of the carrier 13. Under this condition, the extension arms 101 and 102 of the handling machine 11 cannot be successfully inserted into the grooves 131 and 132 of the carrier 13 to move the carrier 13. The control host 12 may then instruct the handling machine 11 to move to a position suitable for transporting the carrier 13.

In one embodiment, the handling machine 11 is also provided with an image-capturing interface 103. The image-capturing interface 103 is adapted to capture external images. For example, the image-capturing interface 103 may include optical elements such as a lens and a photosensitive element. In the embodiment of FIG. 1, the image-capturing interface 103 is arranged in front of the handling machine 11 to capture the image in front of the handling machine 11. However, in one embodiment, the image-capturing interface 103 may also be arranged at any position of the handling machine 11 to capture images from other directions.

In one embodiment, the image (i.e., the target image) captured by the image-capturing interface 103 includes image of the carrier 13 to be transported. In other words, at least partial image of the carrier 13 appears in the target image. The image-capturing interface 103 generates image data DATA(image) based on the captured target image. The image data DATA(image) may carry information about the current position of the carrier 13 in the physical space. And the physical space refers to the actual space where the carrier 13 and the handling machine 11 are present. For example, the image data DATA(image) reflects the relative positional relationship between the carrier 13 and the handling machine 11 in physical space.

The handling machine 11 may transmit the image data DATA(image) to the control host 12. The control host 12 analyses the image data DATA(image) to obtain the contour data corresponding to the carrier 13 in the image data DATA(image). The control host 12 analyses the contour data to obtain the feature data of the carrier 13. This feature data reflects the position of the carrier 13 in the physical space. Then, the control host 12 generates control data DATA (control) based on the feature data. The control data DATA (control) is adapted to control the handling machine 11 to transport the carrier 13 in response to the position of the carrier 13 in the physical space.

Figure 2:
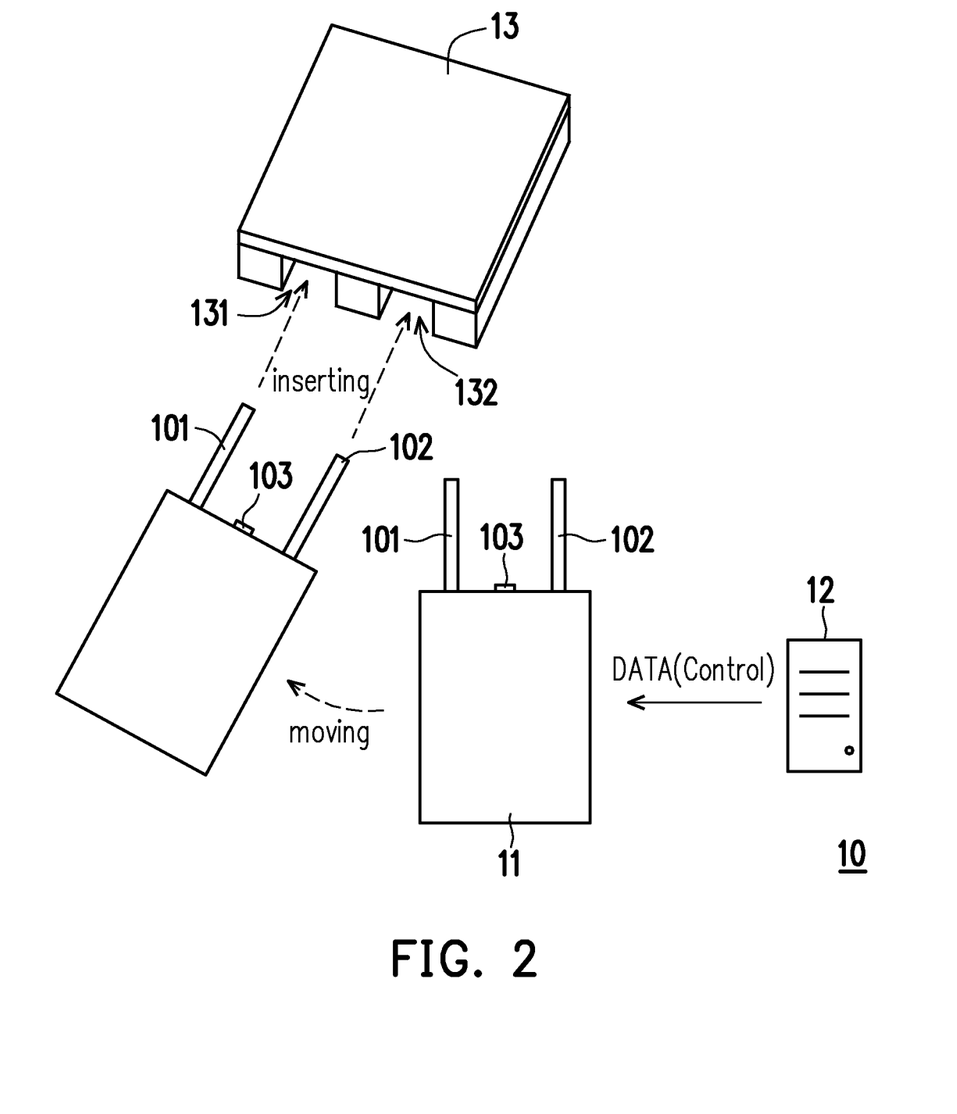
FIG. 2 is a schematic diagram of controlling a handling machine to move and transport a carrier according to an embodiment of the present disclosure.

FIG. 2 is a schematic diagram of controlling a handling machine to move and transport a carrier according to an embodiment of the present disclosure. In FIG. 2, following the embodiment of FIG. 1, based on the image data DATA (image), the control host 12 generates the control data DATA(control) and sends the control data DATA(control) to the handling machine 11. The control data DATA(control) may include a control signal indicating the movement of the handling machine 11.

Based on the control data DATA(control), the handling machine 11 moves to a position suitable for transporting the carrier 13 in response to the current position of the carrier 13 in the physical space, as shown in FIG. 2. In this position for example, the extension arms 101 and 102 of the handling machine 11 may be aligned with the grooves 131 and 132 of the carrier 13. Now, the handling machine 11 only needs to move forward to insert the extension arms 101 and 102 into the grooves 131 and 132 of the carrier 13 to move the carrier 13. In other words, in one embodiment, the control data DATA(control) is adapted to drive the handling machine 11 to insert the extension arms 101 and 102 into the grooves 131 and 132 of the carrier 13 to transport the carrier 13 through the extending arms 101 and 102.

In the embodiment of FIG. 2, during the movement of the handling machine 11, the handling machine 11 may capture the target image continuously and return the corresponding image data DATA(image) to the control host 12. Based on the image data DATA(image) received continuously, the control host 12 modifies the moving tracks of the handling machine 11 continuously through the control data DATA (control), until the handling machine 11 moves to a position suitable for transporting the carrier 13.

Note that, in another embodiment, the control host 12 may also be integrated into the handling machine 11. This way, the handling machine 11 may complete the automated transportation through its own image capturing and data processing mechanism.

Figure 3:
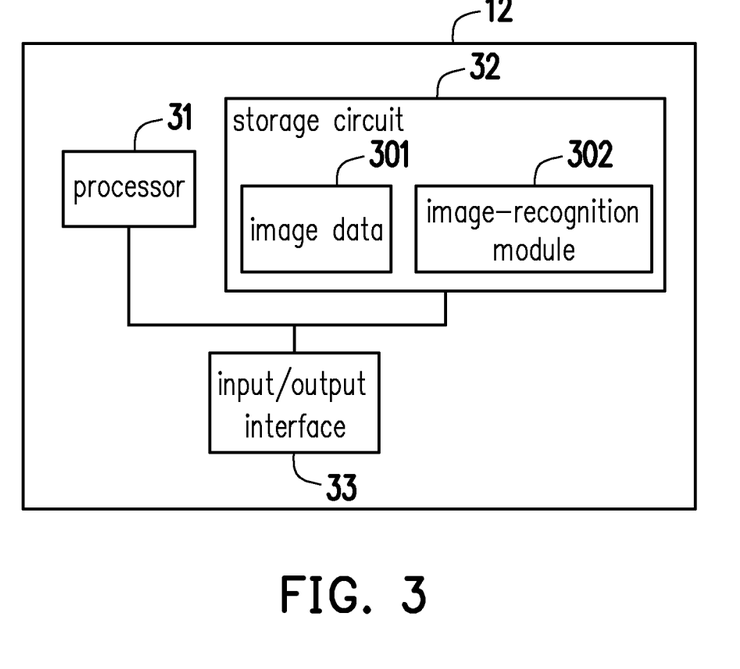
FIG. 3 is a functional block diagram of a control host according to an embodiment of the present disclosure.

FIG. 3 is a functional block diagram of a control host according to an embodiment of the present disclosure. In FIG. 3, a control host 12 includes a processor 31, a storage circuit 32, and an input/output (I/O) interface 33. The processor 31 is adapted to control the whole or part of the operation of the control host 12. For example, the processor 31 may include a central processing unit (CPU), other programmable general-purpose or special-purpose microprocessors, digital signal processors (DSP), a programmable controller, application specific integrated circuits (ASIC), a programmable logic device (PLD), other similar devices, or a combination of these devices. Note that in the following embodiments, the description of the processor 31 is equivalent to that of the control host 12.

The storage circuit 32 is coupled to the processor 31 and adapted to store data. For example, the storage circuit 32 may include a volatile storage circuit and a non-volatile storage circuit. The volatile storage circuit is adapted to store data volatilely. For example, the volatile storage circuit may include random access memory (RAM) or similar volatile storage medium. And the non-volatile storage circuit is adapted for non-volatile storage of data. For example, the non-volatile storage circuit may include a read-only memory (ROM), a solid-state disk (SSD), and/or a conventional hard disk drive (HDD), or other similar non-volatile storage medium.

The input/output interface 33 is coupled to the processor 31 and is adapted to transmit signals. For example, the processor 31 receives input signals or transmits output signals through the input/output interface 33. For example, the input/output interface 33 may include various input/output devices, such as a network connection interface, a mouse, a keyboard, a screen, a touch panel, and/or a speaker.

In one embodiment, the storage circuit 32 is adapted to store image data 301. For example, the image data 301 may be stored in the storage circuit 32 based on the image data DATA(image) in FIG. 1. The processor 31 may read the image data 301 from the storage circuit 32 and generate the control data DATA(control) of FIG. 2 based on the image data 301.

In one embodiment, the storage circuit 32 further stores an image-recognition module 302. The image-recognition module 302 performs image recognition, such as operations of machine vision. The processor 31 may perform image recognition on the image data 301 (that is, data of the target image) through the image-recognition module 302 and generate control data DATA(control) based on the recognition result. The image-recognition module 302 may be trained to recognize a target object (such as the carrier 13 in FIG. 1) from the image data 301. In particular, the image-recognition module 302 may be trained to improve the accuracy of target recognition.

In an embodiment, the image-recognition module 302 is implemented as a hardware circuit. For example, the circuit of the image-recognition module 302 is implemented inside the processor 31 or is independent of the processor 31. The present disclosure is not limited thereto.

In one embodiment, the processor 31 analyses the image data 301 through the image-recognition module 302 to obtain the contour data corresponding to the carrier 13 in the image data 301. For example, the processor 31 recognizes one or more regions (also referred to as target regions) in the target image through the image-recognition module 302. Each target region includes an image of the carrier 13 identified by the image-recognition module 302. Then, the processor 31 obtains the contour data corresponding to the carrier in the image data 301 based on the identified target regions.

Figure 4:
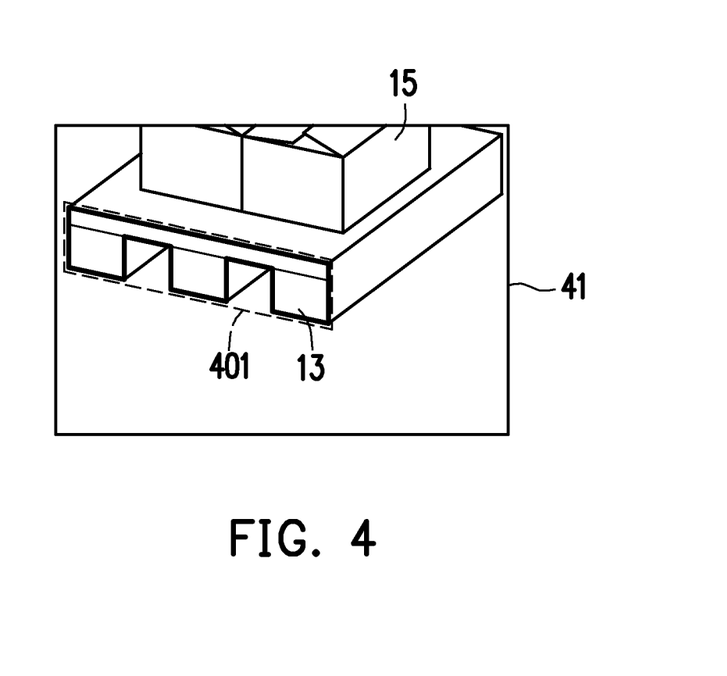
FIG. 4 is a schematic diagram of a target image according to an embodiment of the present disclosure.

FIG. 4 is a schematic diagram of a target image according to an embodiment of the present disclosure. In this embodiment, an image 41 (i.e., the target image) shows the carrier 13 and a cargo 15 (or other objects) placed on the carrier 13. Please refer to FIG. 3 and FIG. 4. In this embodiment, the image data 301 reflects the image 41. Specifically speaking, the image data 301 may at least include image color information and image size information of the image 41.

In an embodiment, the processor 31 analyses the image data 301 through the image-recognition module 302 to recognize the carrier 13 in the image 41. The image-recognition module 302 may select the region where the carrier 13 is located in as a region 401. In other words, the region 401 contains at least partial image of the carrier 13 recognized by the image-recognition module 302.

Figure 5:
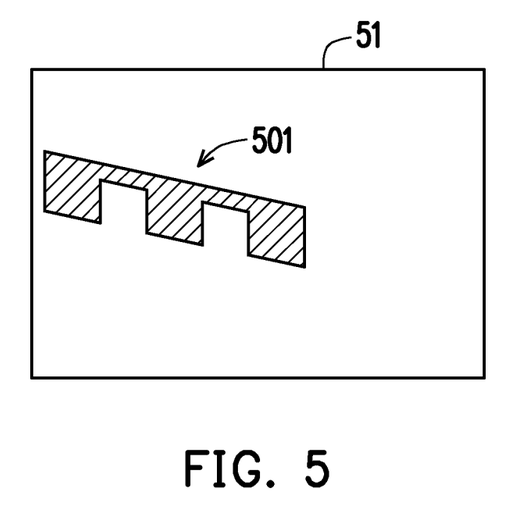
FIG. 5 is a schematic diagram of a contour image of a carrier according to an embodiment of the present disclosure.

FIG. 5 is a schematic diagram of a contour image of a carrier according to an embodiment of the present disclosure. In FIG. 3 and FIG. 5, following the embodiment of FIG. 4, the processor 31 generates an image 51 based on the recognition result of the image-recognition module 302 performed on the carrier 13. For example, the processor 31 filters out the image data outside the region 401 of FIG. 4 to generate the image 51 based on the recognition result of the image-recognition module 302 performed on the carrier 13, such that the image 51 (only) includes a contour 501 of the carrier 13 in the region 401. In an embodiment, the operation of filtering out image data outside the region 401 can also be regarded as filtering out background images other than the image of the carrier 13. In one embodiment, the image 51 is also referred to as the contour image of the carrier 13. The processor 31 may analyse the image data in the range covered by the contour 501 to obtain the pixel distribution information corresponding to the carrier 13 in the original image data 301. Then, the processor 31 generates the feature data of the carrier 13 based on the pixel distribution information.

Figure 6:
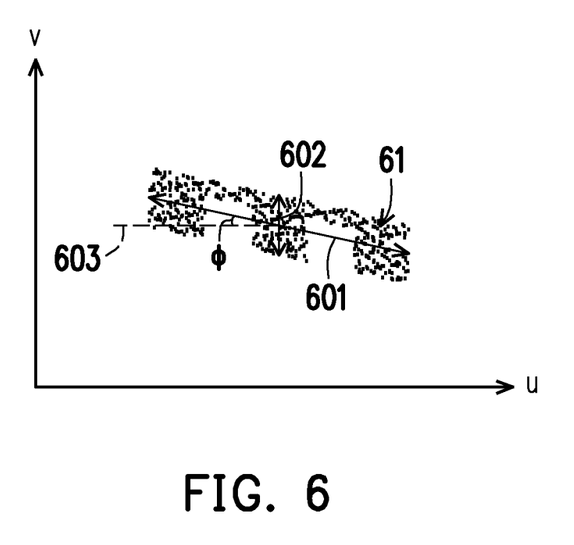
FIG. 6 is a schematic diagram of a feature data of a carrier according to an embodiment of the present disclosure.

FIG. 6 is a schematic diagram of a feature data of a carrier according to an embodiment of the present disclosure. In FIG. 3 and FIG. 6, following the embodiment of FIG. 5, the contour 501 of the carrier 13 may be composed of a plurality of pixels 61. Each pixel 61 is also called a feature point. Each pixel 61 corresponds to a virtual coordinate in a virtual space u-v. The virtual space u-v is formed by a u-axis plane and a v-axis plane. The u-axis plane and the v-axis plane are perpendicular to each other.

In an embodiment, the processor 31 determines a feature vector 601 and a feature vector 602 of the carrier 13 in the virtual space u-v based on the distribution state of the pixels 61. The feature vector 601 reflects the position of the long axis of the contour 501 in FIG. 5 in the virtual space u-v. And the feature vector 602 reflects the position of the short axis of the contour 501 in the virtual space u-v. The feature vectors 601 and 602 together reflect the position of the carrier 13 in the virtual space u-v.

In an embodiment, the processor 31 obtains information of an angle Ø between the feature vectors 601 and 602 and a reference plane 603 in the virtual space u-v. The processor 31 may obtain the relative positional relation between the carrier 13 and the handling machine 11 in the physical space based on the information of the angle Ø. Then, the processor 31 generates control data DATA(control) based on this relative positional relation.

Figure 7:
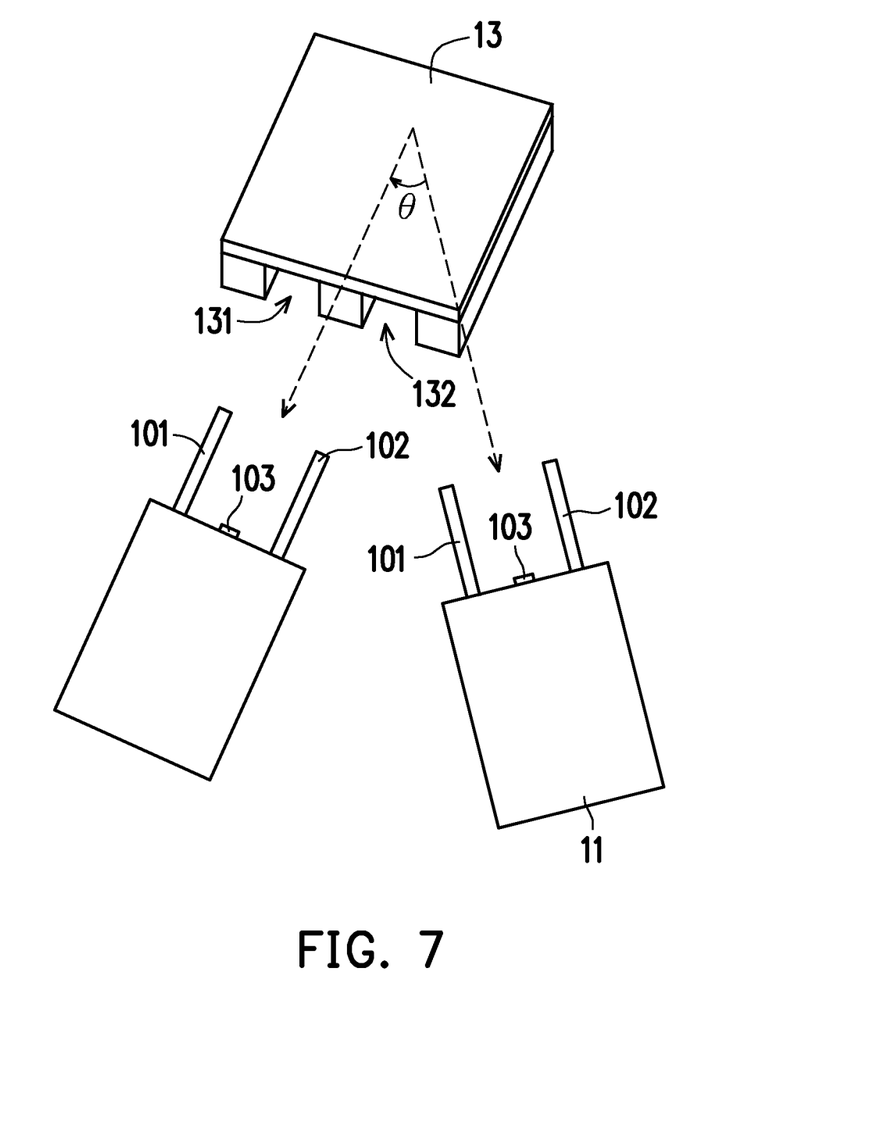
FIG. 7 is a schematic diagram of controlling a handling machine to move and transport a carrier according to an embodiment of the present disclosure.

FIG. 7 is a schematic diagram of controlling a handling machine to move and transport a carrier according to an embodiment of the present disclosure. Please refer to FIG. 3 and FIG. 7 that follows the embodiment of FIG. 6. In one embodiment, the processor 31 maps the angle Ø in the virtual space u-v to the angle Θ in the physical space. This mapping may be accomplished by a conversion equation. This angle Θ reflects an angle difference between the extension arms 101 and 102 of the handling machine 11 and the grooves 131 and 132 of the carrier 13. The processor 31 may generate the control data DATA(control) based on the angle Θ. This way, the control data DATA(control) may drive the handling machine 11 to move to a position suitable for transporting the carrier 13, and the movement amount of the handling machine 11 meets the angle difference defined by the angle Θ. In this position, the extension arms 101 and 102 of the handling machine 11 are aligned with the grooves 131 and 132 of the carrier 13.

In an embodiment, the obtained contour data may also include contour data of images of different sides of the carrier 13. The processor 31 may generate corresponding feature data based on the contour data of the images of different sides of the carrier 13.

Figure 8:
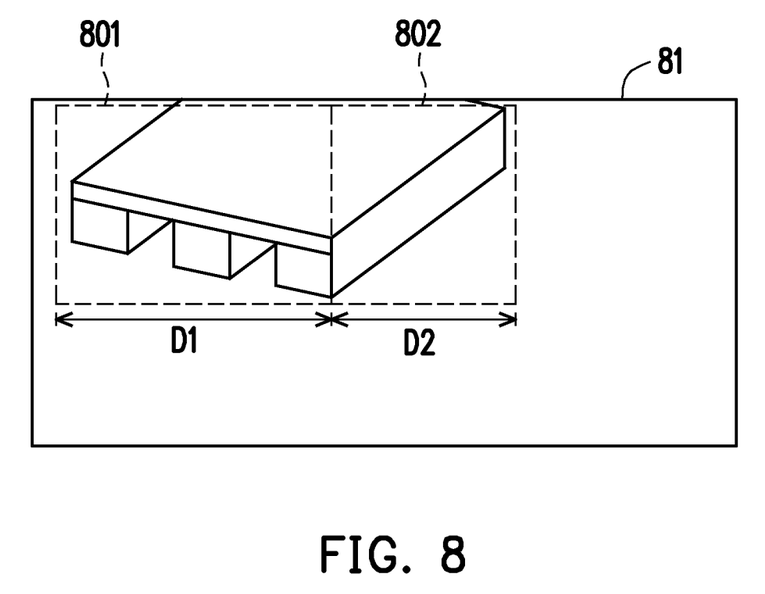
FIG. 8 is a schematic diagram of a contour image of a carrier according to an embodiment of the present disclosure.

FIG. 8 is a schematic diagram of a contour image of a carrier according to an embodiment of the present disclosure. Please refer to FIG. 3 and FIG. 8. In one embodiment, it is assumed that an image 81 is the target image. The processor 31 recognizes contours 801 and 802 from the image 81 through the image-recognition module 302. The contour 801 includes at least partial image from a certain side (also referred to as the first side) of the carrier 13. The contour 802 includes at least partial image from the other side (also referred to as the second side surface) of the carrier 13. Based on the recognition result of the image-recognition module 302 data, the processor 31 obtains the contour data (also referred to as the first contour data) corresponding to the contour 801 in the image data 301 as well as the contour data (also referred to as the second contour data) corresponding to the contour 802 in the image data 301. In other words, the first contour data includes data related to the image of the first side surface of the carrier 13 in the image data 301, whereas the second contour data includes data related to the image of the second side surface of the carrier 13 in the image data 301. The processor 31 may generate the feature data of the carrier 13 based on the first contour data and the second contour data.

In one embodiment, the processor 31 obtains a contour ratio reflected by at least one of the first contour data and the second contour data. The processor 31 may generate the feature data of the carrier 13 based on the contour ratio. For example, the processor 31 respectively counts the total number of pixels on a certain axis in the contours 801 and 802 to obtain a length D1 and a length D2. The lengths D1 and D2 respectively reflect the length proportion of the contours 801 and 802 have in the total contour of the carrier 13. The processor 31 may generate the feature data of the carrier 13 based on the lengths D1 and D2. Then, the processor 31 generates the control data DATA(control) based on the feature data.

In an embodiment, the processor 31 adopts the ratio(s) of the length D1 and D2 as the feature data of the carrier 13. The processor 31 maps the ratio of the lengths D1 and D2 to the angle Θ in the physical space. This mapping may be accomplished by a conversion equation. The processor 31 may generate the control data DATA(control) based on the angle Θ to drive the handling machine 11 to move to a position suitable for transporting the carrier 13, and the moving amount of the handling machine 11 meets the angle difference defined by the angle Θ. The specific details of the operation are described in the embodiment of FIG. 7 and thus not be repeated herein.

In an embodiment, the processor 31 evaluates the location information and the position information of the carrier in the physical space based on the obtained feature data (such as the feature vectors 601 and 602 in FIG. 6). The processor 31 may generate the control data DATA(control) based on this information.

Although the above embodiments all perform operations, such as image recognition and feature data extraction, for only one carrier in physical space to drive and move the handling machine to a position suitable for transporting the carrier, note that in another embodiment, even if there are multiple objects in the physical space (stacked with or scattered upon one another), the control host can also perform image recognition on these carriers based on the operating methods mentioned in the foregoing embodiments and instruct the handling machine to automatically perform subsequent transportation.

An embodiment of the present disclosure also provides a non-volatile computer-readable recording medium. The non-volatile computer readable recording medium stores program codes. The processor (such as the processor 31 in FIG. 3) in the computer may execute (or run) this program code to perform the functions and operations mentioned above.

Figure 9:
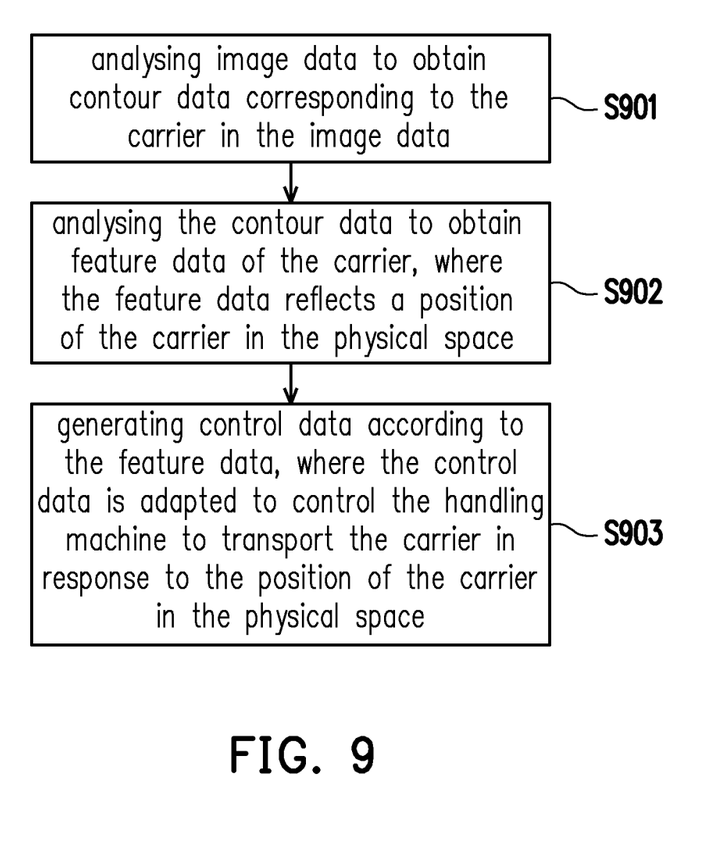
FIG. 9 is a flowchart of a method for controlling a handling machine according to an embodiment of the present disclosure.

FIG. 9 is a flowchart of a method for controlling a handling machine according to an embodiment of the present disclosure. In step S901 of FIG. 9, image data is analysed to obtain contour data corresponding to the carrier in the image data. In step S902, the contour data is analysed to obtain feature data of the carrier, where the feature data reflects a position of the carrier in the physical space. In step S903, control data is generated based on the feature data, where the control data is adapted to control the handling machine to transport the carrier in response to the position of the carrier in the physical space.

As each step in FIG. 9 has been described in detail as above, they are not repeated herein again. Please note that each step in FIG. 9 can be implemented as multiple program codes (such as a software module) or a circuit (such as a circuit module), to which the present disclosure is not limited. In addition, the method in FIG. 9 can be mixed and matched with the above embodiments, or be implemented by itself, to which the present disclosure is not limited.

In sum, the main control device evaluates the position of the carrier in the physical space based on the information related to the carrier in the obtained image data, and then drives the handling machine to move automatically to a position suitable for transporting the carrier based on this position. In one embodiment, even if the location and/or the placement angle of the carrier in the physical space is irregular, the handling machine can still automatically adjust the insertion angle of the extension arm relative to the carrier, so as to lift and transport the carrier smoothly. The efficiency of the handling machine in performing cargo transportation automatically is thereby improved effectively.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims and not by the above detailed descriptions.

What is claimed is:
1. A method for controlling a handling machine, comprising:
    analyzing an image data to obtain a contour data corresponding to a carrier in the image data;
    analyzing the contour data to obtain a feature data of the carrier, wherein the feature data reflects a position of the carrier in a physical space; and
    generating a control data based on the feature data, wherein the control data is adapted to control the handling machine to transport the carrier in response to the position of the carrier in the physical space,
    wherein the contour data comprises a first contour data and a second contour data, and analyzing the contour data to obtain the feature data of the carrier comprises:
    obtaining a contour ratio reflected by at least one of the first contour data and the second contour data; and
    generating the feature data based on the contour ratio.
2. The method for controlling the handling machine according to claim 1, further comprising:
    capturing a target image from an image-capturing interface, wherein the target image comprises an at least partial image of the carrier; and
    generating the image data based on the captured target image.

3. The method for controlling the handling machine according to claim 2, wherein the image-capturing interface is provided on the handling machine.

4. The method for controlling the handling machine according to claim 1, wherein analyzing the image comprises:
performing image recognition on the image data through an image-recognition module, wherein the image-recognition module is trained to recognize the carrier from the image data.

5. The method for controlling the handling machine according to claim 1, wherein analyzing the contour data to obtain the feature data of the carrier comprises:
analyzing the contour data to obtain pixel distribution information corresponding to the carrier in the image data; and
generating the feature data based on the pixel distribution information.

6. The method for controlling the handling machine according to claim 5, wherein generating the feature data based on the pixel distribution information comprises:
generating a feature vector based on the pixel distribution information, wherein the feature vector is adapted to reflect a position of the carrier in a virtual space.

7. The method for controlling the handling machine according to claim 6, wherein generating the control data based on the feature data comprises:
obtaining information of an angle between the feature vector and a reference plane in the virtual space;
obtaining a relative positional relation between the carrier and the handling machine in the physical space based on the information of the angle; and
generating the control data based on the relative position relation.

8. The method for controlling the handling machine according to claim 1, wherein the first contour data comprises data related to an image of a first side surface of the carrier in the image data, and the second contour data comprises data related to an image of a second side surface of the carrier in the image data.

9. The method for controlling the handling machine according to claim 1, wherein the control data is adapted to drive the handling machine to insert an extension arm into an insertion opening of the carrier, so as to transport the carrier through the extension arm.

10. A system for controlling a handling machine, comprising:
a handling machine; and
a control host, coupled to the handling machine,
wherein the control host is adapted to analyze an image data to obtain a contour data corresponding to a carrier in the image data,
the control host is further adapted to analyze the contour data to obtain a feature data of the carrier, wherein the feature data reflects a position of the carrier in a physical space,
the control host is further adapted to generate a control data based on the feature data, and
based on the control data, the handling machine is adapted to transport the carrier in response to the position of the carrier in the physical space,
wherein the contour data comprises a first contour data and a second contour data, and analyzing the contour data to obtain the feature data of the carrier comprises:
obtaining a contour ratio reflected by at least one of the first contour data and the second contour data; and
generating the feature data based on the contour ratio.

11. The system for controlling the handling machine according to claim 10, further comprising:
an image-capturing interface, coupled to the control host, wherein the image-capturing interface is adapted to capture a target image, the target image comprises an at least partial image of the carrier, and
the image-capturing interface is further adapted to generate the image data based on the captured target image.

12. The system for controlling the handling machine according to claim 11, wherein the image-capturing interface is provided on the handling machine.

13. The system for controlling the handling machine according to claim 10, wherein analyzing the image comprises:
performing image recognition through an image-recognition module on the image data, wherein the image-recognition module is trained to recognize the carrier from the image data.

14. The system for controlling the handling machine according to claim 10, wherein analyzing the contour data to obtain the feature data of the carrier comprises:
analyzing the contour data to obtain pixel distribution information corresponding to the carrier in the image data; and
generating the feature data based on the pixel distribution information.

15. The system for controlling the handling machine according to claim 14, wherein generating the feature data based on the pixel distribution information comprises:
generating a feature vector based on the pixel distribution information, wherein the feature vector is adapted to reflect a position of the carrier in a virtual space.

16. The system for controlling the handling machine according to claim 15, wherein generating the control data based on the feature data comprises:
obtaining information of an angle between the feature vector and a reference plane in the virtual space;
obtaining a relative positional relation between the carrier and the handling machine in the physical space based on the information of the angle; and
generating the control data based on the relative position relation.

17. The system for controlling the handling machine according to claim 10, wherein the first contour data comprises data related to an image of a first side surface of the carrier in the image data, and the second contour data comprises data related to an image of a second side surface of the carrier in the image data.

18. The system for controlling the handling machine according to claim 10, wherein the handling machine is further adapted to insert an extension arm into an insertion opening of the carrier based on the control data, so as to transport the carrier through the extension arm.

19. A non-volatile computer readable recording medium, wherein the non-volatile computer readable recording medium stores a program code, and the program code is executed by a processor to:
analyze an image data to obtain a contour data corresponding to a carrier in the image data;
analyze the contour data to obtain a feature data of the carrier, wherein the feature data reflects a position of the carrier in a physical space; and
generate a control data based on the feature data, wherein the control data is adapted to control a handling machine to transport the carrier in response to the position of the carrier in the physical space, wherein the contour data comprises a first contour data and a second contour data, and analyzing the contour data to obtain the feature data of the carrier comprises:

obtaining a contour ratio reflected by at least one of the first contour data and the second contour data; and generating the feature data based on the contour ratio.

* * * * *